(12) United States Patent
Battin

(10) Patent No.: US 7,170,896 B2
(45) Date of Patent: Jan. 30, 2007

(54) COMMUNICATION INFRASTRUCTURE AND METHOD TO PRESERVE COMMUNICATION LINK BANDWIDTH IN A PACKET COMMUNICATION SESSION

(75) Inventor: Robert D Battin, Kildeer, IL (US)

(73) Assignee: Motorola, Inc., Schaumburg, IL (US)

( * ) Notice: Subject to any disclaimer, the term of this patent is extended or adjusted under 35 U.S.C. 154(b) by 895 days.

(21) Appl. No.: 09/885,514

(22) Filed: Jun. 20, 2001

(65) Prior Publication Data
US 2002/0196797 A1 Dec. 26, 2002

(51) Int. Cl.
H04J 3/18 (2006.01)

(52) U.S. Cl. .................... 370/401; 370/352; 370/474

(58) Field of Classification Search .......... 370/310.1, 370/310.2, 313, 328, 338, 349, 392, 393, 370/470, 471, 474, 352–356, 400–406
See application file for complete search history.

(56) References Cited

U.S. PATENT DOCUMENTS

| 5,446,736 | A | 8/1995 | Gleeson et al. | |
|---|---|---|---|---|
| 6,130,883 | A | 10/2000 | Spear et al. | 370/328 |
| 6,201,962 | B1 * | 3/2001 | Sturniolo et al. | 455/432.2 |
| 6,466,964 | B1 * | 10/2002 | Leung et al. | 709/202 |
| 6,608,841 | B1 * | 8/2003 | Koodli | 370/474 |
| 6,735,202 | B1 * | 5/2004 | Ahmed et al. | 370/392 |
| 6,782,503 | B1 * | 8/2004 | Dawson | 714/739 |
| 6,820,233 | B2 * | 11/2004 | Johansson et al. | 714/808 |

FOREIGN PATENT DOCUMENTS

| EP | 1 056 259 A1 | 11/2000 |
|---|---|---|
| WO | WO 97/08838 A2 | 3/1997 |
| WO | WO 00/74259 A2 | 12/2000 |

* cited by examiner

Primary Examiner—Chi Pham
Assistant Examiner—Phuc Tran
(74) Attorney, Agent, or Firm—Jeffrey K. Jacobs

(57) ABSTRACT

To address the need for a communication infrastructure and method for preserving bandwidth when IP messaging is used, the present invention provides for the transmission of information without an IP header and for the subsequent generation of such a header as a message is processed by the infrastructure.

20 Claims, 3 Drawing Sheets

COMMUNICATION INFRASTRUCTURE AND METHOD TO PRESERVE COMMUNICATION LINK BANDWIDTH IN A PACKET COMMUNICATION SESSION

FIELD OF THE INVENTION

The present invention relates generally to the field of wireless communication and, in particular, to preserving bandwidth in a packet communication session.

BACKGROUND OF THE INVENTION

In communication systems the preservation of bandwidth on communication links can be a very high priority. For example, in wireless communication systems wireless spectrum is usually very limited. Efficient and even optimal use of spectrum is critical to the marketability of wireless infrastructure equipment. In addition, the power and ubiquity of the internet protocol (IP) is driving its use in communication systems. However, because of the size of IP headers, using the protocol often requires more bandwidth on communication links. Therefore, a need exists for a communication infrastructure and method for preserving bandwidth when IP messaging is used.

SUMMARY OF THE INVENTION

A method is provided for a communication infrastructure to preserve communication link bandwidth when supporting a packet communication session. The method comprises receiving, by the communication infrastructure, a session response message that indicates a destination IP address and a destination communication port for the packet communication session. The method further comprises determining, by the communication infrastructure, a source IP address and a source communication port for the packet communication session. The method further comprises receiving, by the communication infrastructure from a communication unit, a link-layer packet for the packet communication session and generating, by the communication infrastructure, an IP message header and a UDP message header for the link-layer packet using the source IP address, the source communication port, the destination IP address, the destination communication port, the link-layer packet, and a set of predetermined values to produce an internet protocol (IP) packet comprising the link-layer packet.

A communication infrastructure that comprises a packet controller is also provided. The packet controller is capable of receiving a session response message that indicates a destination IP address and a destination communication port for the packet communication session and capable of determining a source IP address and a source communication port for the packet communication session. The packet controller is also capable of receiving from a communication unit a link-layer packet for the packet communication session and generating an IP message header and a UDP message header for the link-layer packet using the source IP address the source communication port, the destination IP address, the destination communication port, the link-layer packet, and a set of predetermined values to produce an internet protocol (IP) packet comprising the link-layer packet.

DESCRIPTION OF A PREFERRED EMBODIMENTS

To address the need for a communication infrastructure and method for preserving bandwidth when IP messaging is used, the present invention provides for the transmission of information without an IP header and for the subsequent generation of such a header as a message is processed by the infrastructure.

Figure 1:
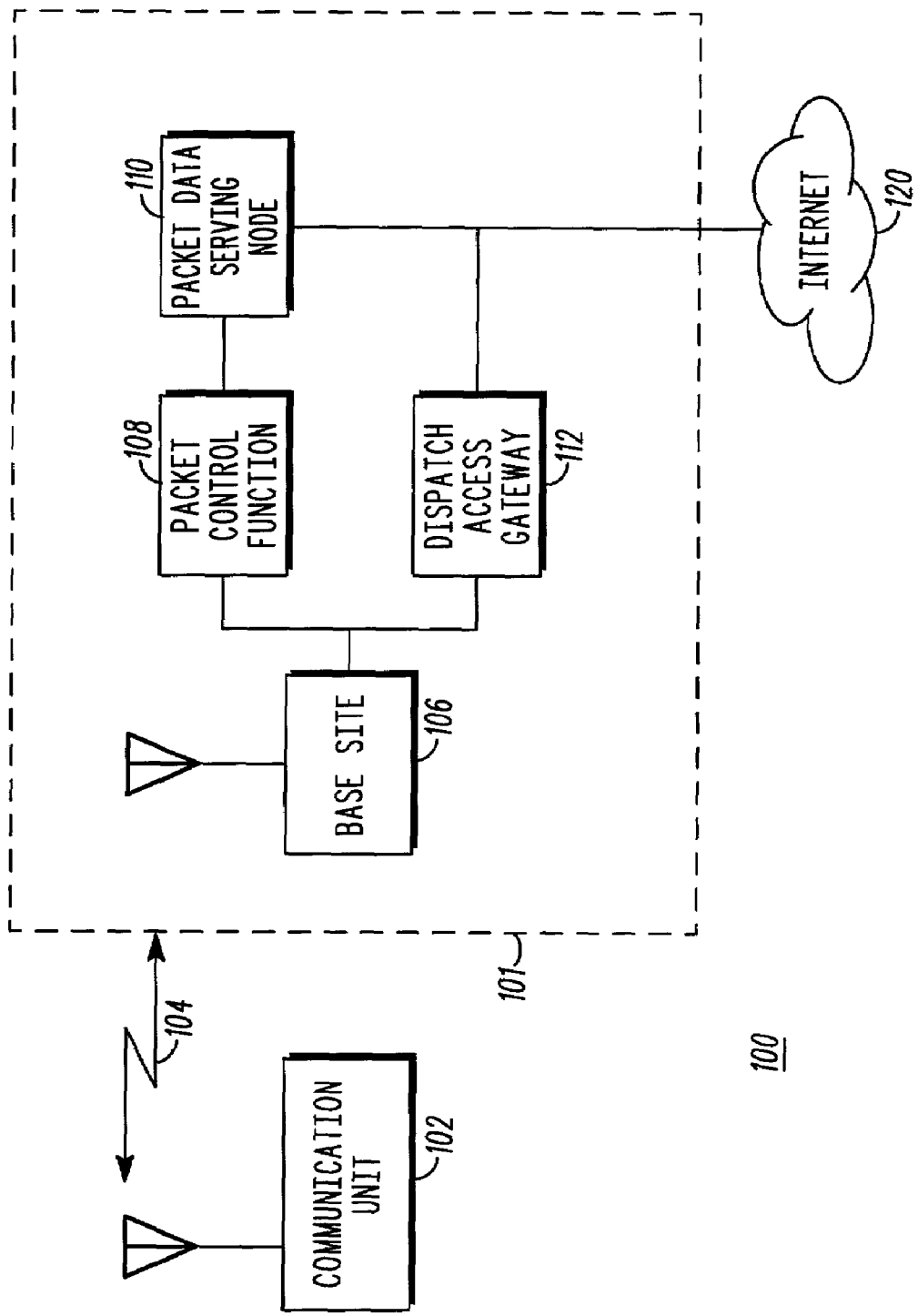
FIG. 1 is a logical, block diagram depiction of a communication system in accordance with a preferred embodiment of the present invention.
Figure 2:
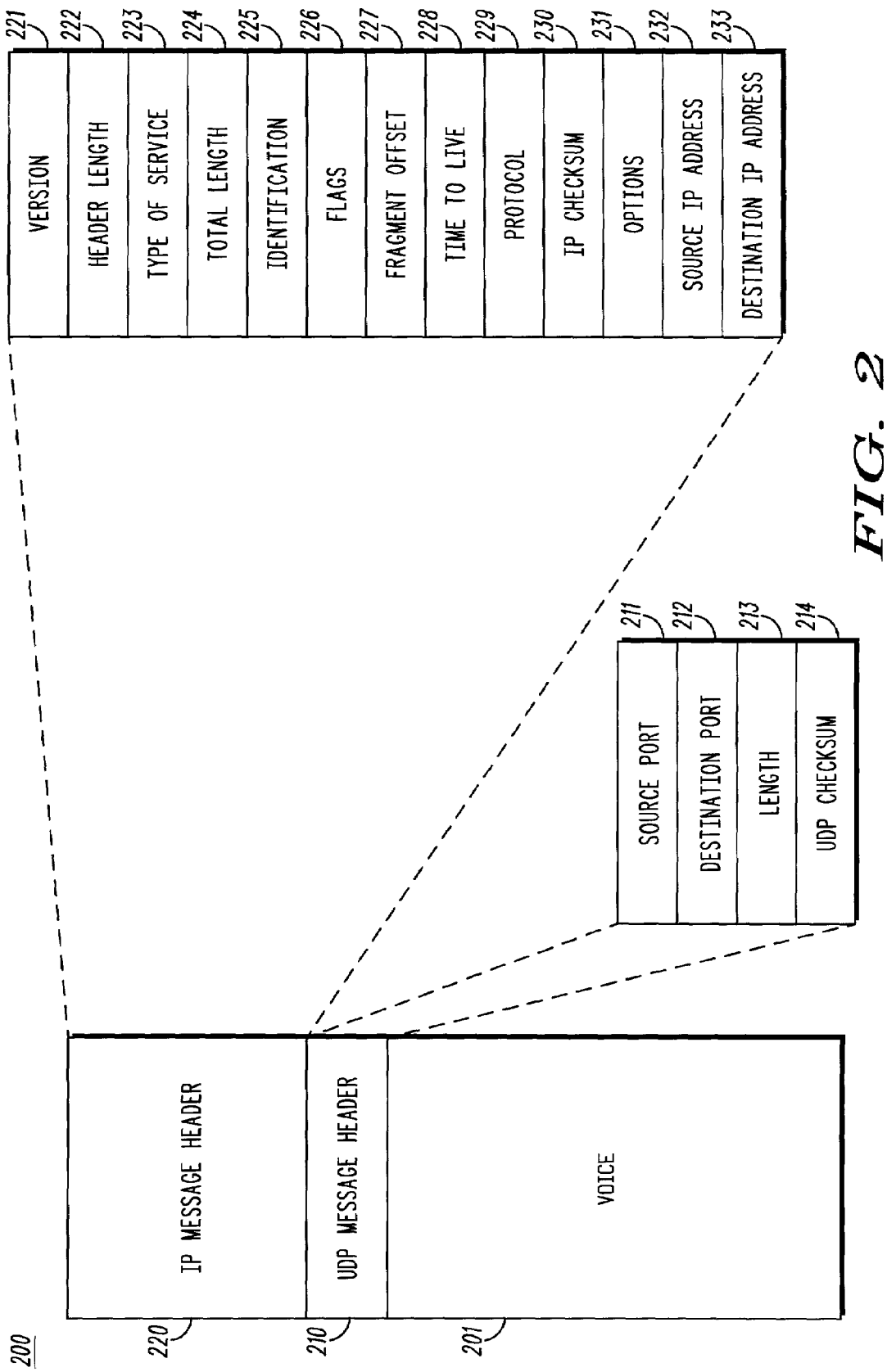
FIG. 2 is a logical, block diagram depiction of a voice-over-IP packet in accordance with a preferred embodiment of the present invention.
Figure 3:
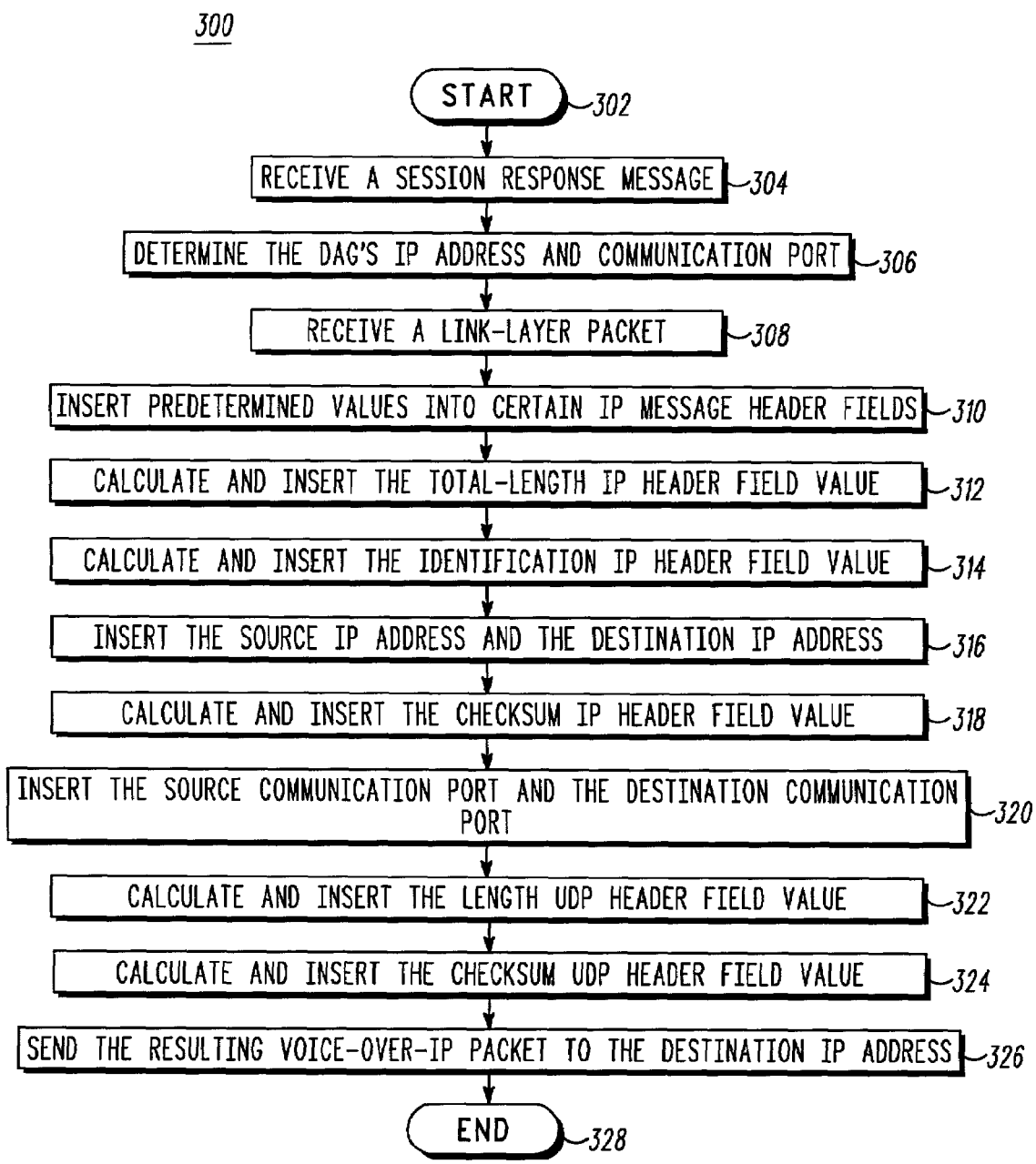
FIG. 3 is a logic flow diagram of steps executed by a dispatch agent gateway in accordance with a preferred embodiment of the present invention.

The present invention can be more fully understood with reference to FIGS. 1–3, wherein like numerals designate like components. FIG. 1 is a logical, block diagram depiction of a communication system in accordance with the preferred embodiment of the present invention. Preferably, communication system 100 is a system in accordance with the well-known Telecommunications Industry Association/Electronic Industries Association (TIA/EIA) standard IS-2000 (CDMA 2000).

System 100 comprises communication infrastructure 101, communication unit 102, and the Internet 120. Communication infrastructure 101 comprises base site (BS) 106, packet control function (PCF) 108, packet data serving node (PDSN) 110, and dispatch agent gateway (DAG) 112. Base sites, packet control functions, and packet data serving nodes are well known in the field of wireless communications and are described in the TIA/EIA's Inter-Operability Specification (IOS) 400. Communication unit 102 preferably comprises a wireless mobile unit and communicates with infrastructure 101, specifically base site 106, via coded-channel, wireless communication resource 104 in accordance with the CDMA 2000 standard. However, the present invention is not limited to wireless communication units or wireless communication resources.

Operation of a preferred communication system, in accordance with the present invention, occurs substantially as follows. DAG 112 is a packet controller device similar to PCF 108. Unlike PCF 108, however, DAG 112 preferably processes packets associated with wireless dispatch services, such as the group call and private call services. To enable communication unit 102 to transmit packet information such as voice or data via communication resource 104 without an internet protocol (IP) header or a user datagram protocol (UDP) header, DAG 112 generates these headers. For a given packet communication session, DAG 112 receives a session response message from a destination device via the Internet (or private intranet) 120 that indicates a destination IP address and a destination communication port for the packet communication session. DAG 112 also determines a source IP address and a source communication port for the packet communication session. Upon receiving a link-layer packet for the packet communication session from communication unit 102, DAG 112 produces an internet protocol (IP) packet comprising the link-layer packet by generating an IP message header and a UDP message header for the link-layer packet using the source IP address, the source communication port, the destination IP address, the destination communication port, the link-layer packet, and a set of predetermined values. DAG 112 then preferably sends the IP packet to the destination via the Internet or a private intranet.

In the preferred embodiment, where DAG 112 is directly coupled to internet 120, DAG 112 has an IP address and port number for use within internet 120. Therefore, when DAG 112 is determining the source IP address and communication port for the packet communication session, DAG 112 preferably uses this predetermined IP address associated with the DAG for the source IP address and the predetermined communication port associated with the DAG for the source communication port. Alternatively, the DAG may access a table that maps communication units to IP addresses and communication ports and thus determine the IP address and communication port associated with the communication unit and use these as the source IP address and the source communication port for the headers generated. In another alternative embodiment, the DAG is not directly coupled to the internet but coupled via a PDSN. Thus, IP packets sent to their destination address are sent via the PDSN. Also, in this architecture the DAG accesses the PDSN to determine the IP address and communication port associated with the communication unit for use as the source IP address and the source communication port.

FIG. 2 is a logical, block diagram depiction of a voice-over-IP packet 200 in accordance with a preferred embodiment of the present invention. Voice-over-IP packet 200 comprises a voice payload 201, a UDP message header 210, and an IP header 220. Voice payload 201 preferably comprises one or more Radio Link Protocol (RLP) voice packets. RLP is a well-known link protocol defined in TIA/EIA's IS-707. UDP message header 210 comprises fields 211–214, and IP message header 220 comprises fields 221–233.

FIG. 3 is a logic flow diagram 300 of steps executed by a dispatch agent gateway in accordance with a preferred embodiment of the present invention. FIG. 3 illustrates a method whereby a communication infrastructure can preserve communication link bandwidth when supporting a packet communication session. The method illustrated in FIG. 3 is preferably carried out by a DAG. In the alternative, however, the functionality could be performed by other infrastructure devices or otherwise distributed among other infrastructure devices. Regardless, the method illustrated in FIG. 3 is preferably implemented by a combination of stored software routines and hardware developed using well-known techniques and technologies.

The logic flow begins (302) when the DAG receives (304) a session response message that indicates a destination IP address and a destination communication port for the packet communication session. In the preferred embodiment, session initiation protocol (SIP), an application-layer protocol defined by the Internet Engineering Task Force (IETF), is used to establish a packet communication session. The session response message, therefore, corresponds to a SIP invite final response message. However, in an alternative embodiment, other messaging schemes may be used to establish the packet session. For example, in an "iDEN" communication system that is commercially available from Motorola, Inc. of Schaumburg, Ill., proprietary messaging is used for this purpose that also indicates a destination IP address and a destination communication port for the packet communication session.

In step 306, the DAG determines a source IP address and a source communication port for the packet communication session. Preferably, the DAG uses the predetermined IP address associated with the DAG for the source IP address and the predetermined communication port associated with the DAG for the source communication port as described above. In step 308, the DAG receives a link-layer packet for the packet communication session from a communication unit. Preferably, this link-layer packet comprises one or more RLP voice packets, although it could alternatively comprise one or more RLP data packets.

To produce a voice-over-IP packet such as voice-over-IP packet 200, the DAG generates IP message header 220 and UDP message header 210 for the link-layer packet using the source IP address, the source communication port, the destination IP address, the destination communication port, the link-layer packet, and a set of predetermined values. In step 310, the DAG preferably inserts predetermined values into version field 221, header-length field 222, type-of-service field 223, flags field 226, fragment-offset field 227, time-to-live field 228, options field 231, and protocol field 229. The predetermined values used are preferably fixed, selected to achieve the system behavior and configuration desired by the users and/or designers according to well-known techniques.

In step 312, the DAG preferably calculates the value for total-length field 224 by adding the length of the link-layer packet, the length of IP message header 220, and the length of UDP message header 210. In step 314, the DAG preferably calculates the value for identification field 225 by incrementing the identification field value calculated for a previous IP packet of the packet communication session. For example, identification field 225 may be calculated by adding one to the identification field value of the previous IP packet generated for this session. In step 316, the DAG inserts the source IP address into source-IP-address field 232 and the destination IP address into the destination-IP-address field 233. To complete IP message header 220, the DAG, in step 318, calculates the value for checksum field 230 by determining the checksum of IP message header 320.

In step 320, the DAG inserts the source communication port into source-port field 211 and the destination communication port into destination-port field 212. In step 322, the DAG calculates the value for length field 213 by adding the length of the link-layer packet and the length of UDP message header 210. To complete UDP message header 210, the DAG, in step 324, calculates the value for checksum field 214 by determining the UDP checksum. Having thus generated voice-over-IP packet 200, the DAG preferably sends (326) packet 200 to the destination IP address and the logic flow ends (328).

The method as illustrated in FIG. 3 shows the steps 304–326 as being performed sequentially. Such an ordering is somewhat arbitrary and does not capture the variety of preferable implementations. For example, steps 306–324 can be rearranged in many preferable orderings based on factors such as the availability of data needed to calculate field values and processing optimizations.

The present invention thus preserves bandwidth by allowing the communication unit to send a link-layer packet without an IP or UDP header. Moreover, the robustness of the present invention allows these headers to be generated in their entirety. Thus, no portion of the headers need be sent with the link-layer packet. This saves the bandwidth that the 28 bytes of headers would otherwise require.

While the present invention has been particularly shown and described with reference to particular embodiments thereof, it will be understood by those skilled in the art that various changes in form and details may be made therein without departing from the spirit and scope of the present invention.

What is claimed is:

1. A method for a communication infrastructure to preserve communication link bandwidth when supporting a packet communication session, the method comprising the steps of:
   receiving, by the communication infrastructure, a session response message that indicates a destination IP address and a destination communication port for the packet communication session;
   determining, by the communication infrastructure, a source IP address and a source communication port for the packet communication session;
   receiving, by the communication infrastructure from a communication unit, a link-layer packet for the packet communication session; and
   generating, by the communication infrastructure, an IP message header and a UDP message header for the link-layer packet using the source IP address, the source communication port, the destination IP address, the destination communication port, the link-layer packet, and a set of predetermined values to produce an internet protocol (IP) packet comprising the link-layer packet.

2. The method of claim 1 wherein the link-layer packet comprises an RLP data packet.

3. The method of claim 1 wherein the link-layer packet comprises at least one Radio Link Protocol (RLP) voice packet and wherein the IP packet comprises a voice-over-IP packet.

4. The method of claim 3 wherein the communication infrastructure comprises a wireless communication infrastructure, wherein the communication unit comprises a wireless mobile unit, wherein the wireless communication infrastructure comprises a dispatch agent gateway (DAG) and wherein the DAG produces the voice-over-IP packet.

5. The method of claim 4 wherein the step of determining comprises the step of determining that a predetermined IP address associated with the DAG is the source IP address and that a predetermined communication port associated with the DAG is the source communication port.

6. The method of claim 4 wherein the step of determining comprises the step of accessing a table that maps communication units to IP addresses and communication units to communication ports to determine the IP address and communication port associated with the communication unit for use as the source IP address and the source communication port.

7. The method of claim 4 wherein the step of determining comprises the step of accessing a PDSN to determine the IP address and communication port associated with the communication unit for use as the source IP address and the source communication port.

8. The method of claim 4 further comprising the step of sending, by the dispatch agent gateway, the voice-over-IP packet to the destination IP address via the Internet.

9. The method of claim 8 further comprising the step of sending, by the dispatch agent gateway, the voice-over-IP packet to the destination IP address via the PDSN.

10. The method of claim 4 further comprising the step of sending, by the dispatch agent gateway, the voice-over-IP packet to the destination IP address via an IP intranet.

11. The method of claim 1 wherein the session response message comprises a SIP invite final response message.

12. The method of claim 1 wherein the step of generating comprises the step of inserting predetermined values from the set of predetermined values into IP header fields selected from the group consisting of a version field, a header-length field, a type-of-service field, a flags field, a fragment-offset field, a time-to-live field, an options field, and a protocol field.

13. The method of claim 1 wherein the step of generating comprises the step of calculating a total-length IP header field value based on the length of the link-layer packet, the length of the IP message header, and the length of the UDP message header.

14. The method of claim 1 wherein the step of generating comprises the step of calculating an identification IP header field value by incrementing the identification field value calculated for a previous IP packet of the packet communication session.

15. The method of claim 1 wherein the step of generating comprises the step of calculating a checksum IP header field value by calculating a checksum of the IP message header.

16. The method of claim 1 wherein the step of generating comprises the step of inserting the source IP address into the source-IP-address field of the IP message header and the destination IP address into the destination-IP-address field of the IP message header.

17. The method of claim 1 wherein the step of generating comprises the step of inserting the source communication port into the source-port field of the UDP message header and the destination communication port into the destination-port field of the UDP message header.

18. The method of claim 1 wherein the step of generating comprises the step of calculating a checksum UDP header field value by calculating a checksum using the link-layer packet and UDP message header.

19. The method of claim 1 wherein the step of generating comprises the step of calculating a length UDP header field value based on the length of the link-layer packet and the length of the UDP message header.

20. A communication infrastructure comprising:
   a packet controller receiving a session response message that indicates a destination IP address and a destination communication port for the packet communication session, determining a source IP address and a source communication port for the packet communication session, receiving from a communication unit a link-layer packet for the packet communication session, and generating an IP message header and a UDP message header for the link-layer packet using the source IP address, the source communication port, the destination IP address, the destination communication port, the link-layer packet, and a set of predetermined values to produce an internet protocol (IP) packet comprising the link-layer packet.

* * * * *